US007689574B2

United States Patent
Chen et al.

(10) Patent No.: US 7,689,574 B2
(45) Date of Patent: Mar. 30, 2010

(54) INDEX AND METHOD FOR EXTENDING AND QUERYING INDEX

(75) Inventors: Wei Zhu Chen, Beijing (CN); Zhong Su, Beijing (CN); Rui Wang, Beijing (CN); Li Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 11/562,495

(22) Filed: Nov. 22, 2006

(65) Prior Publication Data

US 2007/0124277 A1 May 31, 2007

(30) Foreign Application Priority Data

Nov. 29, 2005 (CN) ......................... 2005 1 0124283

(51) Int. Cl.
G06F 17/00 (2006.01)
G06F 15/16 (2006.01)
G06F 3/00 (2006.01)
(52) U.S. Cl. .................. 707/100; 709/201; 709/204; 715/700
(58) Field of Classification Search ............... 707/100; 715/700–866; 709/201
See application file for complete search history.

(56) References Cited

U.S. PATENT DOCUMENTS 6,349,308 B1 * 2/2002 Whang et al. ............ 707/103 Z
7,080,091 B2 * 7/2006 Matsuda ..................... 707/102
2004/0205044 A1 * 10/2004 Su et al. ...................... 707/2

* cited by examiner

Primary Examiner—Tim T. Vo
Assistant Examiner—Bao G Tran
(74) Attorney, Agent, or Firm—Gibb I.P. Law Firm, LLC (57) ABSTRACT

A method, system and program storage device are provided for extending an inverted index, which comprises first and second inverted index subfiles to increase the speed of establishing and updating inverted index files. The method includes performing ordered keyword indexing operations of generating an inverted index from data sources, in which a frequency of occurrence of keywords in each of the data sources is calculated, and writing each keyword, the data sources, and the frequency of occurrence of each keyword in the corresponding data sources to the inverted index. If a number of data sources involved in the indexing operations reaches a first threshold, then writing contents of the inverted index as a smallest grid into the first inverted index subfile. If a number of smallest grids in the first inverted index subfile reaches a second threshold, then merging the smallest grids into a merged grid and writing the merged grid into the second inverted index subfile. If the number of merged grids in the second inverted index subfile reaches a third threshold, then further merging the merged grids into a larger merged grid, and writing the larger merged grid back into the first inverted index subfile.

16 Claims, 5 Drawing Sheets

| Index Item | Document ID | Frequency of Occurence |
|---|---|---|
| an | 1 | 1 |
| Index | 2 | 3 |
| | 1 | 2 |
| | 3 | 1 |
| inverted | 1 | 2 |
| | 2 | 1 |
| ... | ... | ... |

Fig. 1A

| Index Item | Document ID | Frequency of Occurence |
|---|---|---|
| an | 1 | 1 |
| Index | 2 | 3 |
| | 1 | 2 |
| | 3 | 1 |
| inverted | 1 | 2 |
| | 2 | 1 |
| ... | ... | ... |

INDEX AND METHOD FOR EXTENDING AND QUERYING INDEX

TECHNICAL FIELD

The present invention relates to techniques of information retrieval, and more particularly, to a method of establishing and extending index.

BACKGROUND OF THE INVENTION

With the popularity of the Internet and the rapid increase in the amount of information on networks, people increasingly rely on efficient full-text search engines. The full-text search engine, with text as its target, may build up inverted index of word-to-document for a large amount of documents. In response to a user's query for documents (e.g., web pages) with keywords, the search engine will return those documents that contain the keywords back to the user. To cut cost in hardware and software, most of current search engines simply store the inverted index as a file (referred to as inverted file) in the non-volatile storage (such as hard disk), and make search directly over disk index by accessing to the inverted file through file reading/writing operations. China patent application No. 03109847.9 (publication number CN1536509A, publishing date Oct. 31, 2004) disclosed a method for storing inverted index, a method for on-line updating inverted index and inverted index mechanism, which is hereby incorporated in full by reference.

There are two key performance indicators for full-text search, Indexing Building Speed (IBS) and Query Response Time (QRT). Improvement of the two indicators will largely depend on the index structure and the corresponding searching method used by the search engine. A good index structure should be able to increase IBS and reduce QRT.

A traditional indexing method uses two index files, namely a primary index file and a secondary index file, on the disk. In updating the index on the disk, for example, when new documents are indexed into the primary index file, the primary index file needs to be opened and closed frequently, leading to low updating speed.

Thus, in normal indexing processes, instead of performing a writing operation on the index file whenever a new document is indexed, indexing operations are first performed within the memory and file writing operations are performed on a basis of batch. The longer the interval of the batch is, the fewer the number of file writing operations would be and the more memory space would need to be used. On the other hand, the shorter the interval between batches is, the less memory space would be occupied; however, file I/O operations would be more frequent, resulting in slower indexing speed.

There is not an effective technique in the prior art that can efficiently control the number of such file writing operations.

SUMMARY OF THE INVENTION

Therefore, one of the objectives of the invention is to improve data structure of index files in order to increase the speed of establishing and updating disk index files.

In one aspect, the invention proposes a method for extending index, the index comprising a first index subfile and a second index subfile, the method comprising the steps of:

(a) performing indexing operations of generating inverted index for a newly inserted data source in the memory; (b) if the number of source data involved in the indexing operations reaches a first predetermined threshold value k1, sequentially writing the generated inverted index as a smallest grid, or index group, into the first index subfile; (c) if the number of smallest grids in the first index subfile reaches a second predetermined threshold value k2, merging the k2 grids into a larger grid and sequentially writing the larger grid into the second index subfile; otherwise, returning to step (a); and (d) if the number of smallest grids in the second index subfile reaches a third predetermined threshold value k3, merging the k3 grids into a larger grid and sequentially writing the larger grid into the first index subfile and then returning to step (c); otherwise, returning to step (a).

In an embodiment according to the invention, the second threshold value K2 is selected to be equal to the third threshold value K3.

In an embodiment according to the invention, the second threshold value K2 and the third threshold value K3 are selected to be equal to the first threshold value K1.

In an embodiment according to the invention, the source data may be electronic documents including, but not limited to, Word documents, PDF documents and HTML documents.

In an embodiment according to the invention, the index subfiles are stored in a non-volatile storage including, but not limited to, magnetic disk, optical disk and opt-magnetic disk.

In an embodiment according to the invention, the step of merging grids comprises merging blocks of individual grids that correspond to the same index item.

In another aspect, the invention proposed a method for querying index information in an index file, wherein the index file comprises grids sequentially arranged according to their size and each of the grids contains an inverted index for source data, the method comprising:

accessing an grid in the current index file which comprises a corresponding query term; reading the index information of the first block corresponding to the query term; repeatedly reading other blocks corresponding to the query term in other grids until there is not a block corresponding to the query term in other grids; and returning index information of all of the read blocks.

In still another aspect, the invention proposes an index structure, comprising two index files of the same structure, each of the index files comprising grids sequentially arranged according to their size and each of the grids containing an inverted index for source data, wherein the number of source data contained in the smallest grid is $k_1$, and the number of source data in any of other grids is $k_1 * k_2^i$ ($i>=1$) and the number of grids containing the same number of source data is less than $k_2$.

With the method of establishing index using the grid-based index structure according to the invention, the number of grids (or index groups) in an index file increases rather slowly with the rapid increase in the number of indexed documents. Because small grids are always positioned at the top of large grids, index updating would mostly occur in small grids and IO operations on large grids are reduced. Thus, the total number of IO operations is reduced and therefore IBS is increased. Because merging of small grids is relatively quick and large grids remain relatively stable, QRT can be shortened. In addition, by choosing the number of the source data involved in indexing operations within the memory, k1, the memory space used by the indexing operations may be adjusted. And by choosing the number of grids to be merged, k2(k3), QRT may be adjusted.

DETAILED DESCRIPTION OF THE INVENTION

Figure 1A:
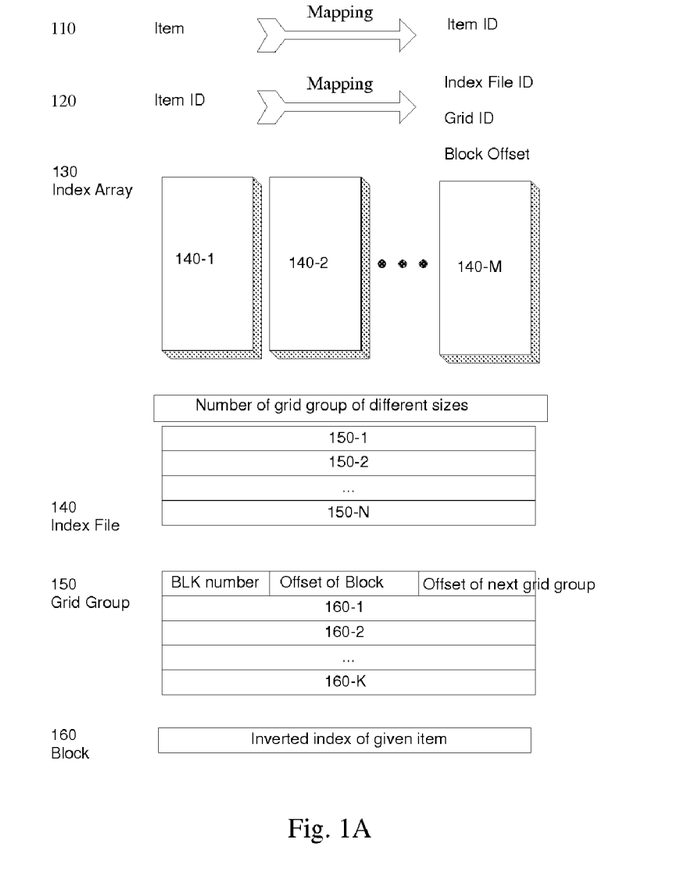
FIG. 1A depicts a data structure of index according the invention.

Refer to FIG. 1A, which depicts a data structure of index according the invention.

According to the invention, an index file 140 is comprised of grids (or index groups) 150, each of which is further comprised of blocks 160.

The index file 140 is comprised of grids 150 of possibly varying sizes. In this invention, the size of a grid denotes the number of data sources included in the grid. For example, the index file 140 as shown includes N grids, 150-1 to 150-N. According to the invention, the grids are arranged in order of their size, with the smallest one at the end of the file. Description on how the grids are arranged in an index file will be given below with reference to FIGS. 2 and 4.

A grid 150 is comprised of blocks 160. The grid 150 in FIG. 1A is shown to include k blocks 160-1 to 160-K.

A block 160 may comprise an inverted index of given index items, and can physically be represented by consecutive disk spaces containing index information of specific index items.

Inverted index is a kind of index structure that is used for increasing the speed and the accuracy of query. An inverted index is a collection of mapping relationships between a certain amount of ordered index items and a certain amount of source data respectively. Source data corresponding to each index item are also sorted according to some relationship. For example, inverted keyword index is a list of mappings between ordered keywords and source data, in which source data corresponding to each keyword are placed according to a certain order (e.g. in order of word frequency). The index block in the inverted index is physically represented as consecutive disk spaces containing the index information of specific index items.

Figure 1B:
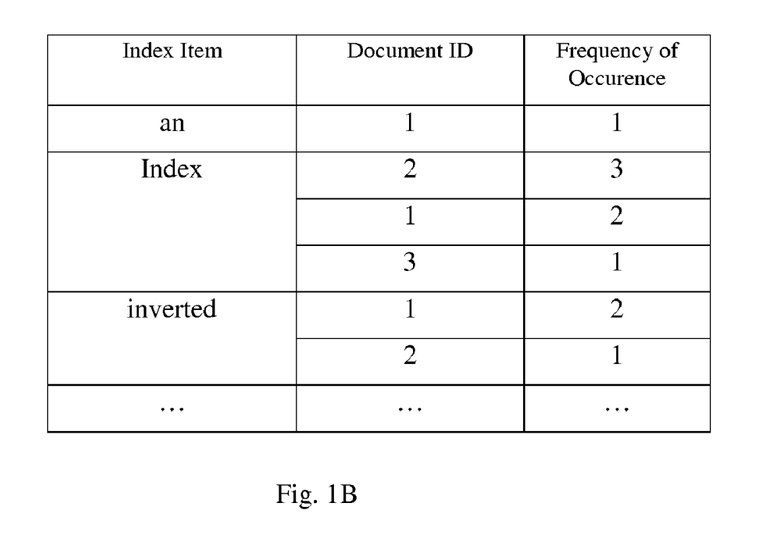
FIG. 1B depicts a logical structure of an inverted index file (or inverted file)

Referring to FIG. 1B, a list is shown to illustrate the structure of a inverted file of keyword index. The list includes index items "an", "index" and "inverted" sequentially arranged in alphabetic order. Each of the index items respectively corresponds to a certain amount of documents. For example, the index item "index" corresponds to three documents. The sequential order of the three documents is document 2, document 1 and document 3, according to the frequency of occurrence of "index" in each of them. As shown in the list, the index item "index", the three ordered documents (2, 3 and 1) and the frequency of occurrence of the index item in those documents forms a block of index.

It shall be noted that, although in FIG. 1A it is shown to record the number of grids of varying sizes in the file head within the index file 140, those skilled in the art shall appreciate that the number of grids of varying sizes and its change do not have to be recorded in the index file; there may be other alternatives. For example, the number of grids of varying sizes can be recorded in a separate table. As another example, different counters may be configured for grids of varying sizes.

In addition, as shown in FIG. 1A, each grid 150 may maintain other information, such as the number of blocks, the offset address of each block in a grid, and the offset address of next group in the index file 140. Similarly, those skilled in the art shall appreciate that those information may also be saved in places other the grid-thus there is no need to give details here.

In order that the invention is understood better, FIG. 1A also illustrates other information, such as an index array 130, a index item-index item ID mapping table 110 and a index item ID-index item mapping table 120.

The index array 130 in FIG. 1A is shown to comprise index files 140-1 to 140-M. In practical applications, a search engine may need a plurality of different index files in response to different user requirements. For example, the index file 140-1 may be a keyword index file, a classification index file, and the like.

Generally speaking, when establishing index, a series of mapping tables in association with an index file shall be established in addition to the index file. For example, the mapping table 110, the mapping table 120, and a document ID-physical address mapping table (not shown).

Those skilled in the art shall appreciate that the document ID-physical address mapping table may be used to record the corresponding relationship between each document and the physical address storing the document. After a desired document is identified through the index file, the document can be accessed using the mapping table. The index item-index item ID mapping table 110 records the corresponding relationship between each index item and an identifier (ID). In comparison with index items, IDs may have relatively unified format (e.g., in the form of digits). Therefore, index item IDs may be used in index files in place of index items themselves.

The mapping table 120 records the position of index information of each index item in the index file. According to an embodiment of the invention, for each index item ID, the address of the first block in the index file corresponding to the index item may be recorded in the table 120. For example, the corresponded index file ID, grid ID and block offset may be recorded.

Depending on specific implementations, there may be other mapping tables, such as index file-index file ID mapping table, grid-grid ID mapping tables, etc.

The establishing and updating of the above mapping tables are all well known to those skilled in the art and there are various implementing solutions in the art, so details are unnecessary to be given here.

With such an index file structure, the invention proposes a method of establishing and extending index file on the basis of grid merging.

Figure 2:
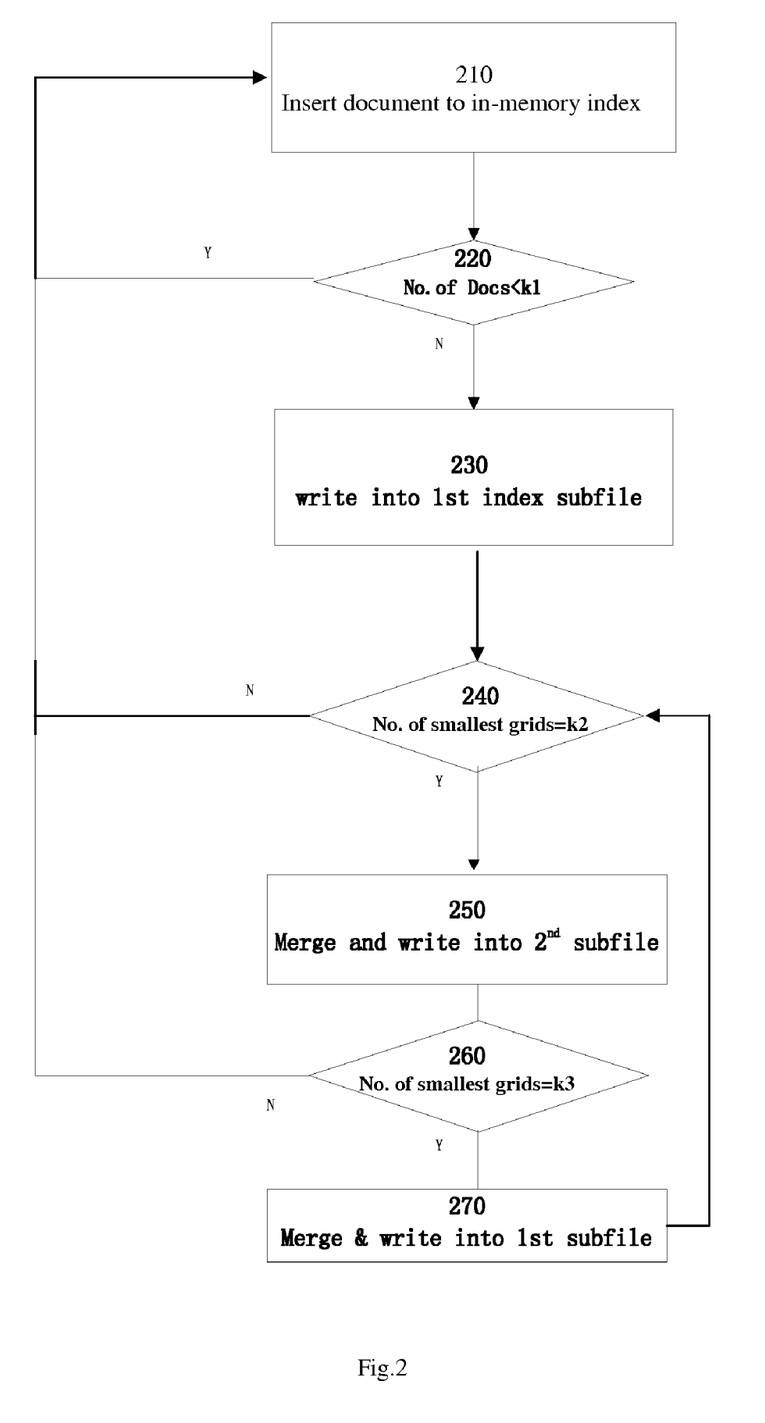
FIG. 2 illustrates a flowchart of a method of extending index according to the invention.

FIG. 2 illustrates a flowchart of a method of index extension executable by a computer according to the invention. According to the method, an index is divided into two sub-files, namely a first index subfile and a second index subfile.

Initially, the computer system executes indexing operations for newly added data sources within the memory to generate an inverted index (Step 210).

It would be appreciated by those skilled in the art that in-memory indexing operations, such as keyword indexing operations on documents, may involve the following procedure: reading a document; analyzing word elements in the document; For each word element, calculating its frequency of occurrence in the document; and then adding the result (document, the word element, the frequency of occurrence) to the inverted index in the memory. The description relating to the above process can also be found in the above-mentioned patent application No. 03109847.9 and is not repeatedly given here.

It shall be noted that the data sources inputted may be any kind of electronic documents readable by computers, such as, but not limited to, Word documents, PDF Documents or HTML documents, depending on the design of the parsing converter used, which is not in the scope of the invention and will not be described in detail.

At Step 220, it is determined whether or not the number of source data involved in the indexing operation is less than a first predefined threshold k1. In other words, it is determined whether the number of source data included in the current inverted index in the memory is less than k1.

If yes, then the indexing operation on the newly added data source is ended, and the process shall return to Step 210 to perform indexing operation on the next data source.

If not, i.e., if the number of source data involved in the indexing operation becomes equal to the predefined threshold k1, then the generated inverted index is written into a first index subfile as a grid of the smallest size (Step 230).

Then, at Step 240, it is determined whether or not the number of grids of the smallest size in the first index subfile has reached a second predefined threshold k1.

If not, the indexing operation on the newly added data source is ended, and the process shall return to Step 210 to perform indexing operation on the next data source.

If yes, however, then at Step 250, the k2 grids are merged into a grid of a larger size which is then sequentially written into a second index subfile.

Then, at Step 260, it is determined whether or not the number of the smallest grids in the second index subfile has reached a third threshold k3.

If not, then the indexing operation on the newly added data source is ended, and the process shall return back to Step 210 to perform indexing operation on the next data source.

If yes, then at Step 270, the k3 grids are merged into a grid of a larger size which is then sequentially written into a first disk index file. Then the process returns back to Step 240.

According to an embodiment of the invention, k2 is equal to k3. According to a further embodiments, k2 and/or k3 is selected to be equal to k1.

It can be seen that, because k1 represents the maximal number of source data involved in the indexing operation within the memory, the smaller k1 is, the less space of memory will be occupied by the indexing operation under a given condition. When the number of the smallest grids in an index file reaches k2(k3), those grids are merged into a larger one. Therefore, the smaller k2(k3) is, the more frequently the merging operation will occur and the faster the index updating will be, leading to shortened QRT.

According to an embodiment of the invention, the first index subfile and the second index subfile may be stored on non-volatile storage devices, which include, but not limited to storage media like magnetic disks, optical disks, etc.

According to the invention, the step of merging grid may further comprise merging the blocks in individual grids that correspond to the same index item. In association with that, the number of blocks in the grid generated as a result of the merging, as well as the offset address of each block and the offset address of the next grid, may be modified.

Obviously, there may be various ways for determining the number of grids of a certain size in the method process mentioned above. For example, the number of grids of a certain size in an index file may be read. The number is updated each time a grid is written into the index file. Also, the number of grids of a different size may be recorded by using a different counter. Each time a grid is written into the index file, a corresponded counter is incremented by one. Each time k2(k3) grids of a certain size are merged together, a corresponded counter is set to zero. Accordingly, in merging grids, records for the numbers of grids of different sizes in the first index subfile and in the second index subfile may be modified in various ways.

Figure 3:
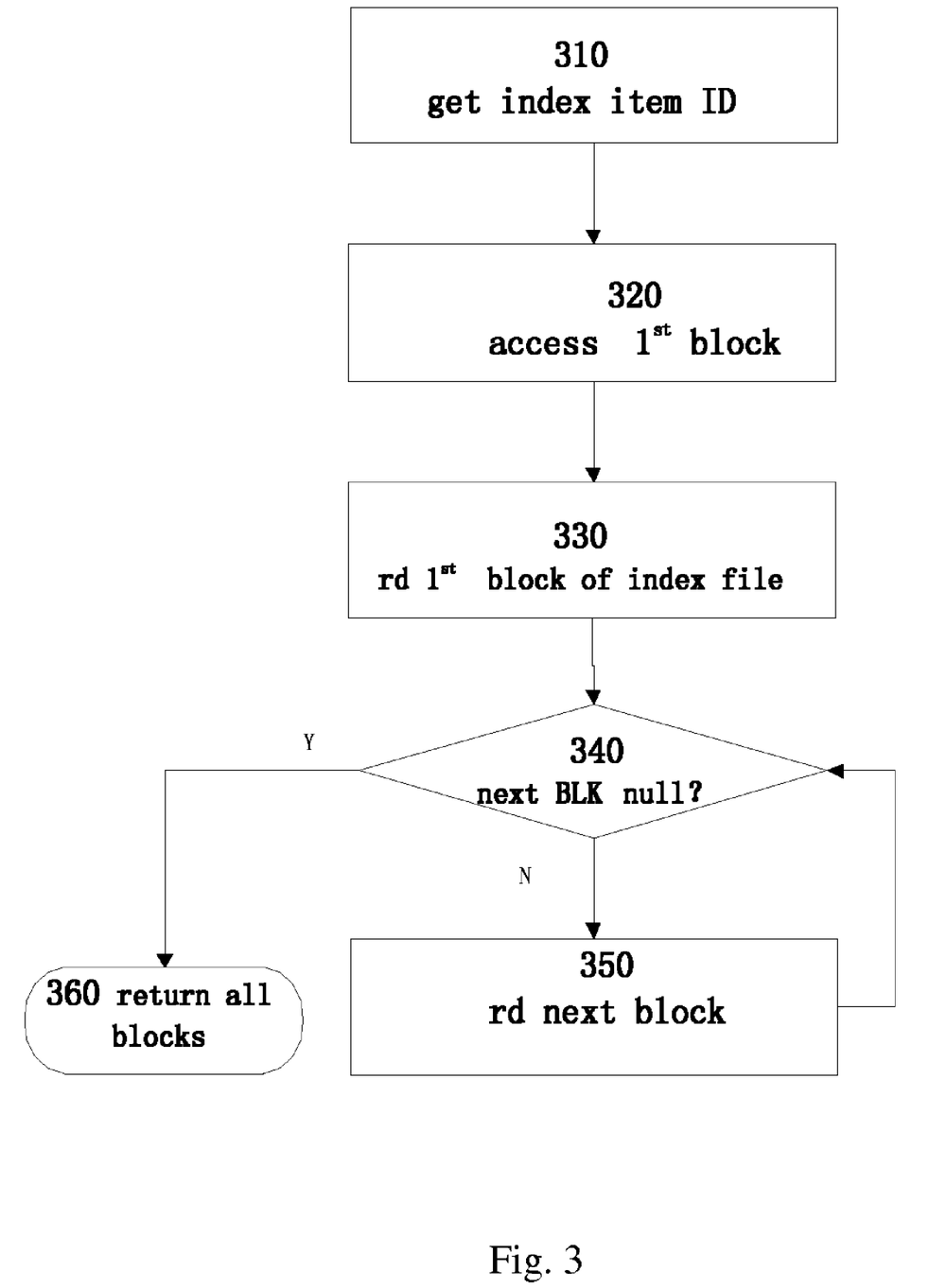
FIG. 3 illustrate a query process in an embodiment according to the invention.

FIG. 3 illustrate a query process by a search system according to an embodiment of the invention.

According to an embodiment of the invention, the search system may perform the query operation on the afore-mentioned inventive disk index file. Initially, assume a user enters a query term (a keyword, for example) into the search system. The search system may obtain a corresponded query term ID (or index item ID)(Step 310). For example, the corresponded query term ID is obtained with the mapping table 110 of FIG. 1A.

At Step 320, the search system access a first block corresponded to the query term. As described previously with reference to FIG. 1A, the search system may obtain the location of the index information of each index item in the index file, or the corresponded block for the query term in the index file, through various data mapping relationships, for example, index item-index file ID mapping, and grid ID-block offset mapping (like the mapping table 120). According to the structure of the index file, the first block is in a relatively large grid located closely to the front.

At Step 330, the first block in the index file corresponded to the query term is accessed. Then, at Step 340, it is determined whether the next block is null or not. The determination may be made by searching other grids in the current index file for presence of any block that is corresponded to the query term.

If, at Step 340, it is determined that the next block is not null, that is, there is still a block corresponded to the query term, then the next block is read at Step 350. After that the process returns to Step 340 to repeat the operation of reading a next block until it is null.

If, at Step 340, it is determined that the next block is null, then all blocks that have been read are returned at Step 360.

Thus the process is completed during which all index information is acquired from an index file in response to the query term submitted by the user. When using the indexing structure of the invention, the search system may perform the same operations in another index file, and thereby may further process index information and return search results to the user.

Figure 4A:
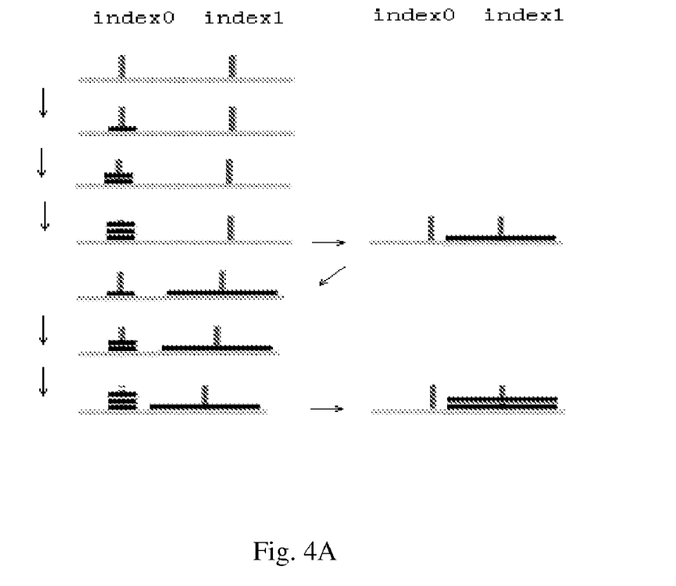
FIGS. 4A-4C are illustrations showing a method of merging grids of index file according to the invention.

FIG. 4A illustratively depicts the principle of merging index grids according the invention. At the top part of the drawing, two pillars (one on the left, another on the right) on the horizontal bar represent two index files, index0 (index file 1) and index1 (index file 2), respectively. The arrows in the drawing indicate the order in which grids are merged.

Initially, both of index file 1 and index file 2 are null. When a grid is generated, it is written into the index file 1. The result is illustratively depicted by one disc inserted by the left pillar. Then, a second grid is generated, which is sequentially written into the index file 1. The result is illustratively depicted by two discs inserted by the left pillar. After that, a third grid is generated, which is sequentially written into the index file 1. The result is illustratively depicted by three discs inserted by the left pillar. At this time, the three grid are merged and written into the index file 2. The result is illustratively depicted by one disc of larger size inserted by the right pillar, shown at the top right part of the drawing. Meanwhile, there is not any disc on the left pillar, indicating that the index file 1 is null.

Then, when the $4^{th}$, the $5^{th}$ and the $6^{th}$ grid is generated, they are respectively written into the index file 1 in the same way as the above. Then, they are merged into a larger grid and sequentially written into the index file 2. As shown at the bottom right part of the drawing, at this moment, there are now two relatively large discs on the right pillar, which represent two relative large grids. Similarly, there is no any disc on the left pillar now, indicating that the index file 1 is null.

From the process described above, it can be seen that whenever the number of grids newly generated in one index file (e.g., index file 1) becomes equal to a value k2 (which is 3 in this case), the k2 grids will be merged into a grid of relative large size and written into another index file (e.g., index file 2). Actually, when the large grids resulted from merging reach a certain amount (e.g. k3=3), they themselves will also be merged into a grid of even larger size and written into the other index file (index file 1), although further illustration is not given here.

In the present case, it is assumed that all of grids 1-6 contain the same number (k2) of source data (e.g., documents), and there is no requirement for the specific value of k1.

Figure 4B:
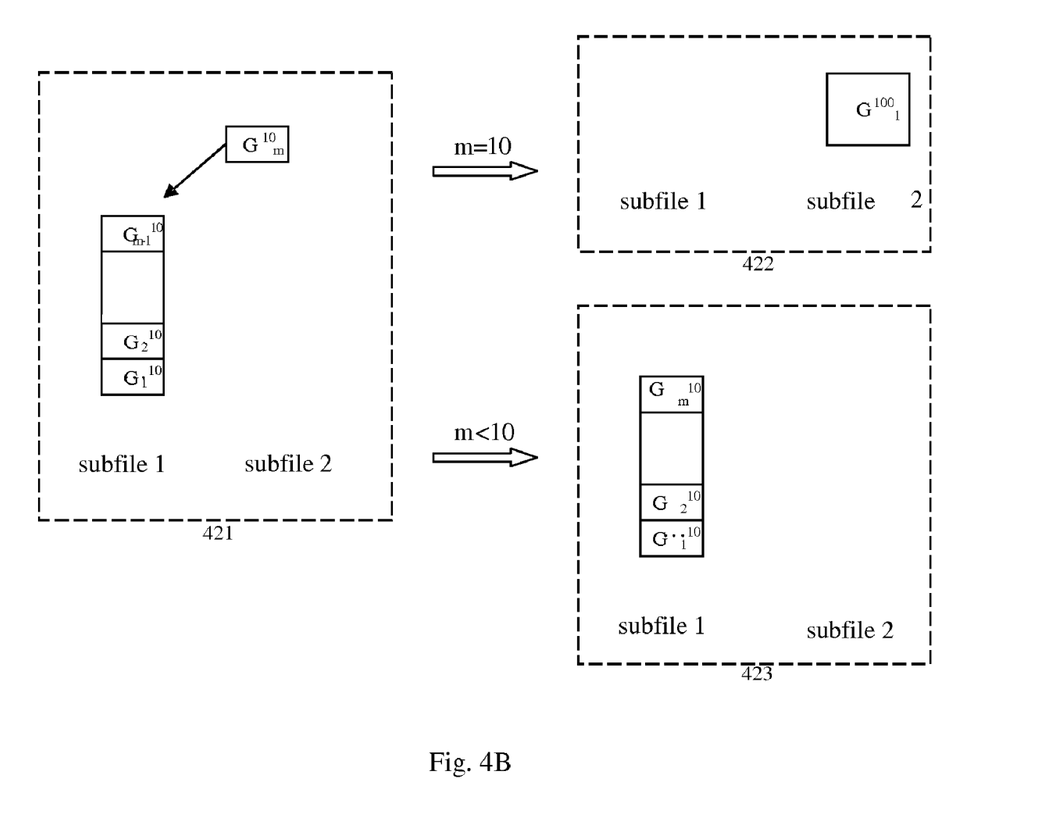

FIG. 4B depicts a process of merging grid in detail. In FIG. 4B, the blocks of dotted line (421, 422, 423) represents an index, which is depicted as comprising an index subfile 1 and an index subfile 2. The three blocks illustrate the content of the index at different time during a merging process. And, for simplicity of description, assume k1=k2=k3=10 in this example. As shown by the block 421, at a certain moment, the index subfile 2 is null, while in the index subfile 1 there have been m−1 grids $G_1^{10}, G_2^{10}, \ldots, G_{m-1}^{10}$, wherein the superscript "10" denotes the size of each of the grids. As is mentioned above, in the context of the invention, the size of a grid indicates the number of source data (e.g., documents) included in the grid. Thus, for example, the expression $G_1^{10}$ denotes a grid $G_1$ that comprises 10 documents.

Later, another grid $G_m^{10}$ is generated which is of the same size.

According to the invention, if m<10, then the grid $G_m^{10}$ will be written into the index subfile 1. As is shown in block 423, at this moment, the number of grids in the index subfile 1 becomes m, and there is no change to the index subfile 2.

However, if m=10, then the m−1 grids $G_1^{10}, G_2^{10}, \ldots, G_{m-1}^{10}$ are merged with $G_m^{10}$ into a grid $G_1^{100}$ that comprises 100 documents, and the resultant grid $G_1^{100}$ is written to the index subfile 2. Meanwhile, the index subfile 1 becomes null. The above process is illustrated in block 422.

Figure 4C:
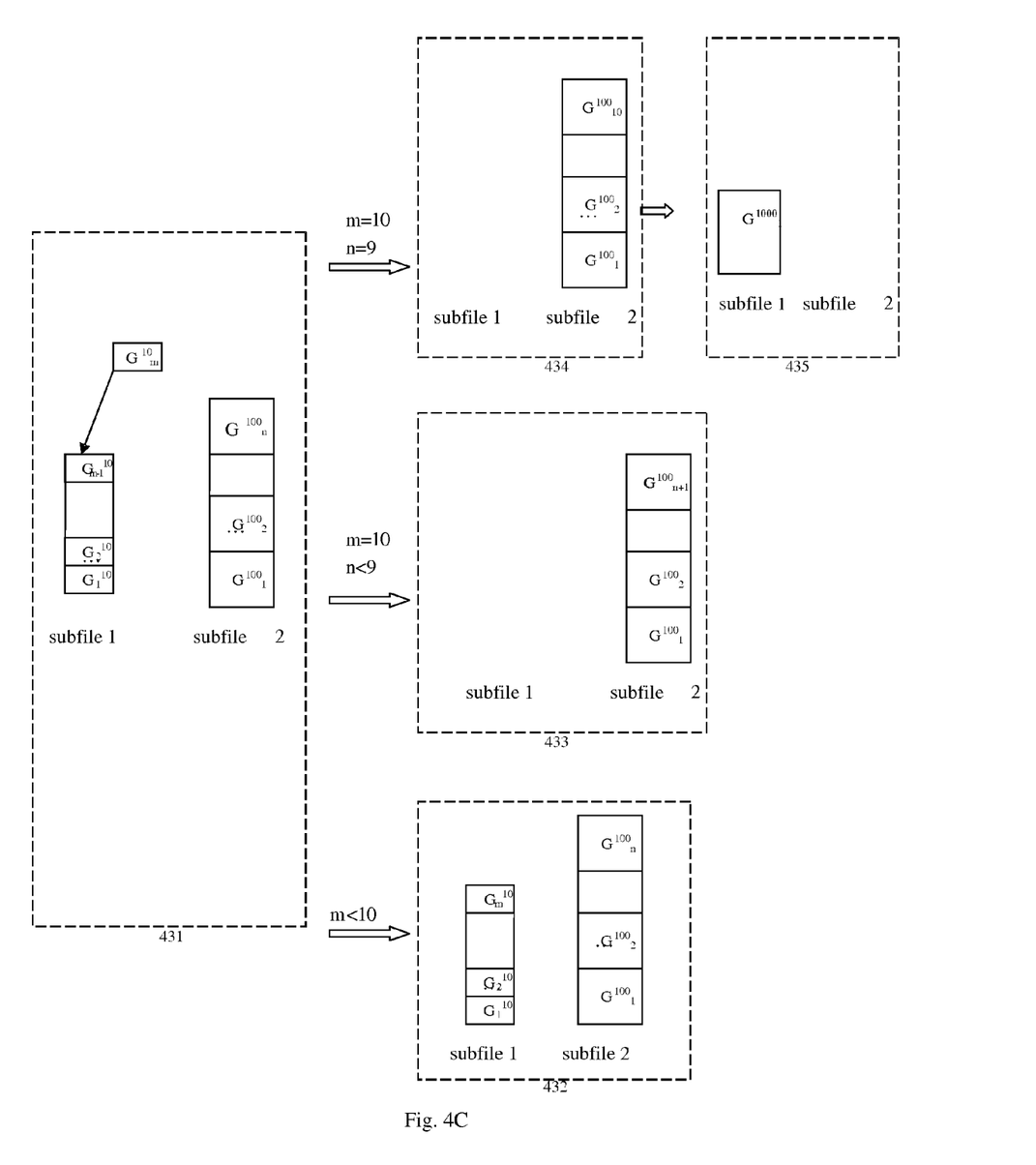

FIG. 4C is a continuation of the grid merging process shown in FIG. 4B. The blocks 431-435 represent the same index as in FIG. 4B. As shown by Block 431, at a certain point of time, the index subfile 1 contains m−1 grids of size 10, and the index subfile 2 contains n grids of size 100. Then, a grid of size 10, $G_m^{10}$, is generated.

If m<10, then the $G_m^{10}$ is written to the index subfile 1. As shown by Block 432, at this point of time, the number of grids in the index subfile 1 is increased to m, whereas the index subfile 2 remains unchanged.

If m=10 and n<9, then the m−1 grids $G_1^{10}, G_2^{10}, \ldots, G_{m-1}^{10}$ are merged with the grid $G_m^{10}$ into a grid which comprises 100 documents and is written to the index subfile 2 as grid $G_{n+1}^{100}$. At the same, the index subfile 1 becomes null. The process is illustrated by Block 433.

If m=10 and n=9, then the m−1 grids $G_1^{10}, G_2^{10}, \ldots, G_{m-1}^{10}$ are merged with the grid $G_m^{10}$ into a grid which comprises 100 documents and is written to the index subfile 2 as grid $G_{n+1}^{100}$. Because the index subfile 2 has already contained 9 grids (n=9) each of which comprises 100 documents, the newly formed grid will be further merged with the 9 grids into a grid $G_1^{1000}$, which comprises $10^3=1000$ documents. At the same time, the index subfile 2 becomes null. The process is illustrated by Blocks 434 and 435 respectively.

From the above process it can be seen that grid merging may frequently occur in grids of relative small sizes. Large grids are relatively stable.

Next, technical effects of the method of the invention will be discussed. For simplicity, assume that k1, k2 and k3 are all equal to k. Generally, When a disk index file is expanded to a certain extent, the grids of varying sizes contained in the two subfiles 1 and 2 of the disk index file may be represented as the following (i>=3):

Index subfile 1: $G(k^i), G(k^{i-2}) \ldots, \ldots, G(k^3), G(k^3)$, $G(k^3) \ldots G(k), G(k), G(k), G(k), G(k), G(k), G(k), G(k), G(k)$ Index subfile 2: $G(k^{i+1}) \ldots G(k^{i-1}) \ldots, \ldots, G(k^2)$ $G(k^2) \ldots$ wherein "k" denotes the size of the smallest grid, or the number of data sources contained in the grid of the smallest size, and "$G(k^i)$" represent a grid comprising $k^i$ data sources. It is noted that the grid size may be denoted as the $n^{th}$ power of k ($k^n$, n>1), wherein "n" is an odd-number in one index subfile, and an even number in another.

If the number of grids of size $k^i$ reaches k, all of the k grids will be merged into a larger grid of size $k^{i+1}$. When the number of grids of size k in the index subfile 1 reaches k, all of the grids will be merged into a larger grid of size k*k in the index subfile 2. At a point of time during this incremental process, the number of grids of size k*k will reach k−1 and the number of grids of size k will reach k−1. If a further grid of size k is to be added to the subfile 1 now, then all of the k grids of size k will be merged into a new grid of size k*k in the index subfile 2. The merging processes in the above observe the follow rules: small grids are always located above relatively large grids; in other words, the smallest set of grid in each subfile is always at the end of the subfile.

If it is assumed that the smallest grid comprises 10 documents (k=10), then it can be calculated that the total number of grids in the index file is not greater than the sum of the individual digits of the total number of documents. For example, if the number of documents to be indexed is 2789870, then the total number of grids will be 2+7+8+9+8+7=41. The grids are positioned in the disk index file in a way as illustrated below:

$G(10^6), G(10^6), G(10^4), G(10^4), G(10^4), G(10^4), G(10^4)$, $G(10^4), G(10^4), G(10^4), G(10^2), G(10^2), G(10^2)$, $G(10^2), G(10^2), G(10^2), G(10^2)$ $G(10^5), G(10^5), G(10^5), G(10^5), G(10^5), G(10^5), G(10^5)$, $G(10^3), G(10^3), G(10^3), G(10^3), G(10^3), G(10^3), G(10^3)$, $G(10^3), G(10^3), G(10), G(10), G(10), G(10), G(10), G(10)$, $G(10)$

Thus it can be seen that, with the grid-based index structure of the invention, the number of grids in the index file increases slowly as the number of indexed documents increase rapidly. The largest grids are always positioned at the head of the index file and small grids are always at the end of large grids, thereby the total number of IO operations is reduced and the IBS is increased. Because the speed of merging small grids is relatively high, and large grids keep relatively stable, the QRT can be shortened. If the speed of updating index slows down resulting in longer QRT, the parameter k2(k3) may be lowered automatically so as to speed up the updating of index. In addition, the maximal number of documents involved in indexing operations performed in the memory, k1, may be adjusted flexibly according to the capacity of the memory. For example, when the space of memory becomes small, k1 is lowered automatically.

It is to be noted that, the above method of the invention may be embodied in the form of a computer executable program stored on computer readable storage media. The storage media include, but not limited to, various storage devices and storage elements, semiconductor devices, magnetic units such as optical, magnetic and opt-magnetic disks.

The preferred embodiments of the invention have been described in the above with reference to the accompanying drawings. However, those embodiments are illustrative rather than restrictive and various modifications and variations may be made by those skilled in the art without departing from the spirit and scope of the invention.

The invention claimed is:

1. A computer-implemented method of extending an inverted index, the inverted index comprising a first inverted index subfile and a second inverted index subfile, the method comprising:
    performing, by a computer, ordered keyword indexing operations of generating an inverted index from one or more data sources in the memory,
        wherein ordered keyword indexing operations comprise:
            calculating a frequency of occurrence of keywords in each of the one or more data sources; and
            writing each keyword, the one or more data sources corresponding to each keyword, and the frequency of occurrence of each keyword in the corresponding one or more data sources to the inverted index;
    if a number of data sources involved in the indexing operations reaches a first threshold value, k1, then writing, by said computer, contents of the inverted index as a smallest grid into the first inverted index subfile, until said number of data sources equals k1, otherwise returning to the performing ordered keyword indexing operations;
    if a number of smallest grids in the first inverted index subfile reaches a second threshold value, k2, then merging, by said computer, the k2 smallest grids into a merged grid and writing the merged grid into the second inverted index subfile, until said number of smallest grids equals $k_2$, otherwise, returning to the performing ordered keyword indexing operations; and
    if the number of merged grids in the second inverted index subfile reaches a third threshold value, k3, then further merging, by said computer, the merged k3 grids into a larger merged grid, writing the larger merged grid into the first inverted index subfile, and returning to the merging of the k2 smallest grids into a merged grid and writing the merged grid into the second inverted index subfile, until said number of merged grids equal $k_3$, otherwise, returning to the performing indexing operations.

2. The method as defined in claim 1, wherein k2 is equal to k3.

3. The method as defined in claim 2, wherein at least one of k2 and k3 is equal to the first threshold value k1.

4. The method as defined in claim 1, wherein the first index subfile and the second index subfile are stored in a non-volatile storage including magnetic disk, optical disk and opt-magnetic disk.

5. The method as defined in claim 1, wherein the source data is any electronic document including Word documents, PDF documents and HTML documents.

6. The method as defined in claim 1, wherein merging grids comprises merging blocks of individual grids that correspond to the same index item.

7. A computer system for extending an inverted index, the inverted index comprising a first inverted index subfile and a second inverted index subfile, the system comprising:
    a memory that stores an inverted index from one or more data sources, and grids in a first inverted index subfile and a second inverted index subfile,
        wherein said grids comprise contents of the inverted index, the first inverted index subfile, and the second inverted index subfile; and
    a processor configured to:
        generate an inverted index structure, comprising two inverted index subfiles of the same structure, each of the two inverted index subfiles comprising grids arranged according to their size and each of the grids containing an inverted ordered keyword index for source data,
            wherein the number of data sources contained in a smallest grid is $k_1$, and the number of data sources in any of other grids is $k_1 * k_2'$ (i>=1) and the number of grids containing the same number of data sources is less than $k_2$;
        perform ordered keyword indexing operations of generating an inverted index from one or more data sources in the memory,
            wherein ordered keyword indexing operations comprise:
                calculating a frequency of occurrence of keywords in each of the one or more data sources; and
                writing each keyword, the one or more data sources corresponding to each keyword, and the frequency of occurrence of each keyword in the corresponding one or more data sources to the inverted index;
        if a number of data sources involved in the indexing operations reaches a first threshold value, k1, then write contents of the inverted index as a smallest grid into the first inverted index subfile, until said number of data sources equals k1, otherwise return to the perform ordered keyword indexing operations;
        if a number of smallest grids in the first inverted index subfile reaches a second threshold value, k2, then merge the k2 smallest grids into a merged grid and write the merged grid into the second inverted index subfile, until said number of smallest grids equals k2, otherwise, return to the perform ordered keyword indexing operations; and
        if the number of merged grids in the second inverted index subfile reaches a third threshold value, k3, then further merge the merged k3 grids into a larger merged grid, write the larger merged grid into the first inverted index subfile, and return to the merge of the k2 smallest grids into a merged grid and to the write of the merged grid into the second inverted index subfile, until said number of merged grids equal $k_3$, otherwise, to return to the perform indexing operations.

8. The computer system as defined in claim 7, wherein $k_1$ is equal to $k_2$.

9. The computer system as defined in claim 7, wherein the source data is electronic document, and the inverted index is inverted keyword index.

10. A computer program storage device readable by a computer, tangibly embodying a program of instructions executable by said computer to perform a method of extending an inverted index, the inverted index comprising a first inverted index subfile and a second inverted index subfile, said method comprising:
    performing ordered keyword indexing operations of generating an inverted index from one or more data sources in the memory, wherein ordered keyword indexing operations comprise:
  calculating a frequency of occurrence of keywords in each of the one or more data sources; and
  writing each keyword, the one or more data sources corresponding to each keyword, and the frequency of occurrence of each keyword in the corresponding one or more data sources to the inverted index;
if a number of data sources involved in the indexing operations reaches a first threshold value, k1, then writing contents of the inverted index as a smallest grid into the first inverted index subfile, until said number of data sources equals k1, otherwise returning to the performing ordered keyword indexing operations;
if a number of smallest grids in the first inverted index subfile reaches a second threshold value, k2, then merging the k2 smallest grids into a merged grid and writing the merged grid into the second inverted index subfile, until said number of smallest grids equals $k_2$, otherwise, returning to the performing ordered keyword indexing operations; and
if the number of merged grids in the second inverted index subfile reaches a third threshold value, k3, then further merging the k3 merged grids into a larger merged grid, writing the larger merged grid into the first inverted index subfile, and returning to the merging of the k2smallest grids into the merged grid and writing the merged grid into the second inverted index subfile, until said number of merged grids equal $k_3$, otherwise, returning to the performing ordered keyword indexing operations.

11. The computer program storage device as defined in claim 10, wherein k2 is equal to k3.

12. The computer program storage device as defined in claim 9, wherein at least one of k2 and k3 is equal to the first threshold value k1.

13. The computer program storage device as defined in claim 10, wherein the first index subfile and the second index subfile are stored in a non-volatile storage including magnetic disk, optical disk and opt-magnetic disk.

14. The computer program storage device as defined in claim 10, wherein the source data is any electronic document including Word documents, PDF documents and HTML documents.

15. The computer program storage device as defined in claim 10, wherein merging grids comprises merging blocks of individual grids that correspond to the same index item.

16. The computer program storage device as defined in claim 10, wherein merging grids further comprises updating −+ record containing the numbers of grids of different sizes in associated subfiles.

* * * * *